United States Patent [19]

Rempel et al.

[11] Patent Number: 4,816,525

[45] Date of Patent: Mar. 28, 1989

[54] POLYMER HYDROGENATION PROCESS

[75] Inventors: Garry L. Rempel, Waterloo; Navroz A. Mohammadi, Sarnia; Rajeev Farwaha, Kitchener, all of Canada

[73] Assignee: University of Waterloo, Waterloo, Canada

[21] Appl. No.: 70,023

[22] Filed: Jul. 6, 1987

[51] Int. Cl.$^4$ ............................................... C08F 8/04
[52] U.S. Cl. ................... 525/338; 525/329.3; 525/339
[58] Field of Search .................... 525/338, 339

[56] References Cited

U.S. PATENT DOCUMENTS

| | | | |
|---|---|---|---|
| 3,454,644 | 7/1969 | Dewhirst | 260/520.9 |
| 4,464,515 | 8/1984 | Rempel et al. | 525/338 |
| 4,631,315 | 12/1986 | Buding et al. | 525/338 |
| 4,673,757 | 6/1987 | Fiedler et al. | 558/431 |

FOREIGN PATENT DOCUMENTS 3529252  5/1986  Fed. Rep. of Germany .

OTHER PUBLICATIONS

Robinson et al., J. Chem-Soc. Dalton Trans. pp. 1912 to 1920 (1973).

*Primary Examiner*—Joseph L. Schofer
*Assistant Examiner*—Bernard Lipman
*Attorney, Agent, or Firm*—Sim & McBurney

[57] ABSTRACT

Selective hydrogenation of the carbon-carbon double bonds of conjugated diene copolymers is effective homogeneous solution in an organic solvent in the presence of certain divalent ruthenium carbonyl complex catalysts. The ruthenium catalysts have the general formula:

$$Ru(CO)HA(Z)_3 \qquad (1)$$

wherein A is a halogen atom, most preferably chlorine, or a hydrogen atom and Z is -$PR_1R_2R_3$ in which $R_1$, $R_2$ and $R_3$ are the same or different and are selected from alkyl and aryl groups, preferably all the phenyl group, or have the general formula:

$$Ru(CO)XY(Z)_2 \qquad (2)$$

wherein X is a carboxylate group, particularly $ClCH_2COO-$, $Cl_2CHCOO-$, $Cl_3CCOO-$, $F_3CCOO-$, $CH_3COO-$, $C_6H_5COO-$ or p—$ClC_6H_4COO-$, y is a halogen atom, preferably a chlorine atom or a bromine atom, or a hydrogen atom or a carboxylate group, Z is as defined above.

24 Claims, No Drawings

POLYMER HYDROGENATION PROCESS

FIELD OF INVENTION

The present invention relates to the selective hydrogenation of the carbon-carbon double bonds in a copolymer of a conjugated diene and one or more copolymerizable monomers using a particular catalyst.

BACKGROUND TO THE INVENTION

Several homogeneous and heterogeneous processes based on rhodium or palladium metal catalysts have been proposed and are now being used to hydrogenate carbon-carbon double bonds in acrylonitrile-butadiene copolymers and other similar polymers For example, French Pat. No. 2,421,923 discloses the partial hydrogenation of the double bonds in acrylonitrile-butadiene rubber (NBR) over a palladium/charcoal catalyst.

German Offenlegungsschrift No. 3,046,008 discloses the selective hydrogenation of the double bonds in conjugated diene containing polymers such as NBR, wherein the catalyst is palladium and at least one other element on a support which may be silica, alumina or activated carbon.

German Offenlegungsschrift No. 3,046,251 discloses a similar process except that the catalyst support is channel or furnace carbon black.

Published British Patent Application No. 2,070,023A discloses a process for the selective hydrogenation of the double bonds in unsaturated organic polymers such as acrylo-nitrile-butadiene-styrene polymers, when in the form of an aqueous emulsion, using a catalyst such as chloro-tris(triphenylphosphine)rhodium in a hydrocarbon solution.

U.S. Pat. No. 3,898,208 describes a process for hydrogenation of latexes of oil-insoluble polymers of conjugated dienes. The latex is dispersed in a swelling agent for the polymer and hydrogenated in the presence of a catalyst complex which may be a rhodium complex catalyst such as chlorotris(triphenylphosphine)rhodium. The swelling agent must also be a solvent for the catalyst complex.

U.S. Pat. No. 3,700,637 discloses that the double bonds in alternating copolymers of conjugated dienes and unsaturated nitriles may be hydrogenated using catalysts which preferably are homogeneous rhodium halide complex catalysts having the formula $L_3RhX$ wherein X is halogen and L is an organophosphorus or organoarsenic stabilizing ligand. It is also preferred that an excess of the ligand be used during the hydrogenation, the mole ratio of ligand to rhodium complex being between about 10:1 and about 150:1.

British Pat. No. 1,558,491 discloses the hydrogenation of the double bonds in copolymers of a conjugated diene and an $\alpha,\beta$-unsaturated carboxylic acid or derivative thereof, for example acrylonitrile, using as catalyst a homogeneous monovalent or trivalent rhodium halide complex of the formula $L_3RhX_n$ wherein X is chlorine or bromine, n is 1 or 3, and L is a ligand. An additional 5 to 25 weight percent, based on the copolymer of the ligand may optionally be used. The amount of hydrogenation is highly solvent dependent.

U.S. Pat. No. 3,480,659 describes a process for the selective hydrogenation of double bonds in unsaturated monomers containing 2 to 20 carbon atoms using a homogeneous rhodium hydride complex catalyst, for example, hydridotetrakis(triphenylphosphine)rhodium, along with an excess of a complexing ligand, for example triphenylphosphine. The mole ratio of ligand to catalyst is between about 10:1 and about 150:1.

Italian Pat. No. 912,648 discloses that cycloalkadienes and alkadienes may be selectively hydrogenated to the corresponding cycloalkenes and alkenes using a catalyst such as hydridotetrakis(triphenylphosphine)rhodium.

More recently, there issued U.S. Pat. Nos. 4,464,515 and 4,503,196 in which one of us is named as an inventor. U.S. Pat. No. 4,464,515 describes the hydrogenation of carbon-carbon double bonds in copolymers of conjugated dienes and copolymerizable monomers in the presence of a monovalent rhodium hydride complex of the formula $RhHL_{1x}$ in which x is 3 or 4 and $L_1$ is a first ligand, a second ligand compound $L_2$ and a solvent for the compound. U.S. Pat. No. 4,503,196 describes the selective hydrogenation in the absence of added ligand and in the presence of a monovalent rhodium hydride complex of the formula $RhHL_x$ where, when x is 4, L is a phosphorus compound which is 5-phenyl-5H-dibenzophosphole or a compound of formula $PR_1R_2R_3$ or, when x is 3, L is an arsenic or antimony compound of the formula $MR_1R_2R_3$, wherein M is arsenic or antimony, and wherein $R_1$, $R_2$ and $R_3$ are selected from $CH_3$, $C_2H_5$, $C_{6-10}$ aryl groups and $C_{7-12}$ aralkyl groups.

The advantage of the processes described in the latter two patents is that improved rates of hydrogenation are achieved under relatively mild conditions and that the degree of hydrogenation is relatively insensitive to the amount of solvent used.

However, rhodium is an expensive metal and hence we made an investigation to look for an efficient but cheaper hydrogenation process based on other catalyst materials.

In U.S. Pat. No. 4,631,315, there is described the hydrogenation of nitrile group-containing polymers in a low molecular weight ketone as a solvent using certain ruthenium catalysts having the formula:

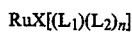

wherein X represents hydrogen or halogen, $L_1$ represents hydrogen, halogen or optionally substituted cyclopentadienyl, $L_2$ represents phosphine, bisphosphine or arsine, n is 1, 2 or 3 and $[(L_1)(L_2)_n]$ represents a cyclopentadienyl bisphosphine. The data presented in this patent suggests that free ligand is necessary to achieve acceptable reaction rates.

In published German patent application No. 3,529,252, there is also described the hydrogenation of nitrile group-containing polymers in a low molecular weight ketone using other ruthenium catalysts, this time of the formula:

wherein $R_1$ is an alkyl, aryl, cycloalkyl or aralkyl, L represents phosphine or arsine, m is 0 or 1, n is 1 or 3 and p is 2 or 3.

SUMMARY OF INVENTION

In accordance with the present invention, there is provided a novel process for the selective hydrogenation of the carbon-carbon double bonds in a copolymer of a conjugated diene and one or more copolymerizable monomers using certain ruthenium complexes, as described below and which are not described in the aforementioned U.S. Pat. No. 4,631,315 nor in German OS 3,529,252.

Accordingly the present invention provides an improvement in a process for the selective hydrogenation of the carbon-carbon double bonds in a copolymer of a conjugated diene and at least one copolymerizable monomer. The improvement comprises effecting the hydrogenation in the presence of at least one divalent carbonyl-containing ruthenium complex selected from the group consisting of:

(a) a ruthenium complex of the general formula:

$$Ru(CO)HA(Z)_3 \qquad (1)$$

wherein A is a halogen atom or a hydrogen atom, Z is a $-PR_1R_2R_3$ group in which $R_1$, $R_2$ and $R_3$ may be the same or different and are selected from alkyl and aryl groups, and (b) a ruthenium complex of the general formula:

$$Ru(CO)XY(Z)_2 \qquad (2)$$

wherein X is a carboxylate group, Y is a halogen atom, a carboxylate group or a hydrogen atom, and Z is as defined above.

The ruthenium complex catalysts achieve efficient and effective selective hydrogenation of the carbon-carbon double bonds and such selective hydrogenation may be achieved without substantial cross-linking the copolymer, for example, an acrylonitrile-butadiene rubber (NBR).

GENERAL DESCRIPTION OF THE INVENTION

Essential to the present invention is the effecting of selective hydrogenation of carbon-carbon double bonds in NBR, styrene-butadiene rubber and similar copolymers of conjugated dienes and copolymerizable monomers, using particular ruthenium complexes containing carbonyl ligands. The ruthenium complexes also may contain halide, hydride, phosphine and/or carboxylate ligands.

One class of such ruthenium complexes which may be employed have the general formula:

$$Ru(CO)HA(Z)_3 \qquad (1)$$

In this formula, A is a halogen atom, preferably a chlorine or bromine atom, more preferably a chlorine atom or a hydrogen atom. The group Z is a substituted phosphine group of the formula $-PR_1R_2R_3$. The groups $R_1$, $R_2$ and $R_3$ may be the same or different and are alkyl and/or aryl groups, preferably selected from methyl, ethyl, $C_6$ to $C_{10}$ aryl groups and $C_7$ to $C_{12}$ aralkyl groups. More preferably, each of $R_1$, $R_2$ and $R_3$ is a phenyl group, so that Z is a triphenylphosphine group. Compounds corresponding to formula (1) are air stable and catalytically active. Specific examples of particularly preferred compounds corresponding to formula (1) comprise carbonylchlorohydrido(tristriphenylphosphine) ruthenium (II) and carbonyldihydrido(tristriphenylphosphine) ruthenium (II). Complexes according to formula (1) may be readily synthesized by routine procedures.

This first group of complexes may be modified further by reacting with appropriate carboxylic acids to provide carbonylcarboxylato-derivatives of ruthenium (II), and thereby provide a second class of ruthenium complexes useful in the process of the invention. The coordinated properties of the carboxylate ligand-containing complexes, combining high catalyst stability with relatively high catalytic activity, render them particularly effective in the process of the present invention.

The suitable carbonylcarboxylato-derivatives of ruthenium(II) which are employed herein correspond to the general formula:

$$Ru(CO)XY(Z)_2 \qquad (2)$$

in which X is a carboxylate group corresponding to the formula $R_4COO-$, Y is a halogen atom, preferably a chlorine or bromine atom, a carboxylate group corresponding to the formula $R_5COO-$ or a hydrogen atom, and Z is as defined above with respect to formula (1). The carboxylate groups $R_4COO-$ and $R_5COO-$ may be the same or different and comprise alkyl and aryl carboxylate groups, including halo-substituted alkyl and aryl carboxylate groups. Specific preferred carboxylate groups are mono-, di- and tri-halo substituted acetate, including $ClCH_2COO-$, $Cl_2CHCOO-$, $Cl_3CCOO-$ and $F_3CCOO-$, unsubstituted acetate i.e. $CH_3COO-$, unsubstituted benzoate i.e. $C_6H_5COO-$, alkyl-substituted benzoate, including p-$CH_3C_6H_4COO-$ and halo-substituted benzoate, including p-$ClC_6H_4COO-$.

Specific examples of particularly preferred compounds corresponding to formula (2) comprise chlorochloroacetato(carbonyl)bis(triphenylphosphine) ruthenium(II), chlorodichloroacetato(carbonyl)bis(triphenylphosphine)ruthenium(II), chlorotrichloroacetato (carbonyl)bis(triphenylphosphine)ruthenium(II), chlorotrifluoroacetato(carbonyl)bis(triphenylphosphine) ruthenium(II), chloroacetato(carbonyl)bis(triphenylphosphine)ruthenium(II), chlorobenzoato(carbonyl)bis (triphenylphosphine)ruthenium(II), bromobenzoato (carbonyl)bis(triphenylphosphine)ruthenium(II), bis-(p-chlorobenzoato)carbonylbis(triphenylphosphine)ruthenium(II), hydrido-p-toluato(carbonyl)bis(triphenylphosphine) ruthenium(II), chlorobenzoato(carbonyl)-bis(triethyl phosphine)ruthenium(II), and chlorobenzoato(carbonyl)bis(diphenylmethylphosphine)ruthenium(II).

None of the complexes of formulae (1) and (2) are disclosed or suggested in the prior art as useful to effect selective hydrogenation of carbon-carbon double bonds in copolymers of a conjugated diene and one or more copolymerizable monomers. The only prior art of which the applicants are aware which discloses ruthenium complexes for such a purpose is the aforementioned U.S. Pat. No. 4,631,315 and German O.S. 3,529,252. In comparison to formulae (1) and (2), this prior art does not disclose complexes containing carbonyl ligands Preparative procedures for the formation of the ruthenium carbonyl complexes used in the present invention are described in the literature, for example, by Robinson et al, J.Chem-Soc. Dalton Trans., pp.1912 to 1920 (1973). The hydrido- and carbonyl-carboxylatoruthenium(II) complexes may be prepared by such procedures, or may be generated in situ in the medium in which the selective hydrogenation is effected. For example, the carbonyl chlorohydridotris (triphenylphosphine)ruthenium(II) complex may be synthesized via aldehyde decarbonylation with dichlorotris(triphenylphosphine)ruthenium(II) complex, or may be generated in situ by adding dichloro tris(triphenylphosphine)ruthenium(II) and an approximately equal weight amount of propionaldehyde to a copolymer solution used in an atmosphere of hydrogen, optionally in the presence of added ligand, triphenylphosphine. Similarly, the carbonylcarboxylato-derivatives of formula (2) may be formed in situ from the complex of formula (1) and the respective carboxylic acid under a nitrogen atmosphere.

In the present invention, the ruthenium carbonyl complexes of formulae (1) or (2) are used to effect selective hydrogenation of carbon-carbon double bonds in copolymers of a conjugated diene and one or more copolymerizable monomers. Such copolymers may be random, alternating or of block structure. Suitable conjugated dienes include $C_{4\text{ to }6}$ conjugated dienes, such as butadiene, isoprene, dimethylbutadiene and piperylene. Suitable copolymerizable monomers include acrylonitrile and methacrylonitrile, alkenylaromatic hydrocarbons, such as styrene and α-methylstyrene, and $C_{3\text{ to }\alpha 6}$ ,β-unsaturated mono- or polycarboxylic acids, such as itaconic, fumaric, maleic, acrylic and methacrylic acids.

Preferred copolymers to which the present invention may be applied include butadiene-acrylonitrile copolymer, butadiene-methacrylonitrile copolymer, copolymers of butadiene with acrylonitrile or methacrylonitrile and one or more of the $C_{3\text{ to }6}$ α,β-unsaturated carboxylic acids, isoprene-acrylonitrile copolymer, isoprene-methacrylonitrile copolymer, and AB, ABA and ABCBA block copolymers wherein A is butadiene or isoprene, B is styrene or α-methylstyrene and C may be a coupling agent residue.

The selective hydrogenation is effected in any convenient manner in a solvent for the copolymer containing the catalyst. The copolymer is dissolved in the solvent and the resulting solution is degassed. The reaction vessel containing the copolymer solution is pressurized with hydrogen gas and the catalyst is added to and dissolved in the solution. Alternatively, the catalyst is added to and dissolved in the copolymer solution and then the reaction vessel may be pressurized with hydrogen. The reaction vessel is rapidly heated to the desired temperature and agitation is initiated. The hydrogenation reaction is allowed to proceed for the desired length of time with the hydrogen pressure preferably held constant. Upon completion of the hydrogenation reaction, the hydrogenated copolymer may be recovered by any convenient method.

The reaction vessel is pressurized with gaseous hydrogen usually from about 0.5 to about 7 MPa and preferably about 2.5 to about 5.0 MPa. It is preferred to employ pure hydrogen but hydrogen containing small amounts of inert gases, such as nitrogen, also may be used.

The hydrogenation reaction usually is effected at a temperature of about 80° to about 200° C., preferably about 110° to about 155° C. Under the preferred conditions of temperature and pressure, essentially complete hydrogenation of the carbon-carbon double bonds may be achieved in about 2 to about 9 hours, depending on the catalyst, temperature and pressure used. By using suitable conditions of time and temperature, it is possible to obtain copolymers which are only partially hydrogenated. The degree of hydrogenation may be adjusted to suit the requirements for the product required.

The concentration of ruthenium complex catalyst employed in the hydrogenation process usually ranges from about 0.1 to about 4 wt. % of polymer. High loadings of ruthenium catalyst may result in an undesirable isomerization of the $\Delta^{4,5}$-unsaturated nitrile bonds to the stable α,β-unsaturated nitrile moiety. Accordingly, it is preferred to employ less than about 0.8 wt. % of the ruthenium complex catalyst when hydrogenating acrylonitrile-butadiene copolymers, since the undesirable isomerization is avoided at such catalyst levels. In addition, such isomerization may be reversed for a polymer produced at excessive levels of catalyst by effecting further hydrogenation of the product at catalyst levels of 0.8 wt. % or below or by effecting further hydrogenation in the presence of a rhodium complex catalyst of the type described in the above-mentioned U.S. Pat. No. 4,503,196, preferably $HRh(PPh_3)_4$ or $ClRh(PPh_3)_3$.

Some cross-linking or gel formation may occur during the selective hydrogenation process. Such gel formation has been observed when hydrogenating NBR with carbonylchlorohydridotris(triphenylphosphine)-ruthenium (II) or chloroacetato(carbonyl)bis(triphenylphosphine) ruthenium(II) complexes. However, gel formation may be avoided by the addition of gel formation—inhibiting ligand compounds to the copolymer solution containing such catalysts. The amount of ligand compound added may be from about 1.0 to about 2.0 wt. % of the copolymer and the weight ratio of added ligand compound to ruthenium complex catalyst may vary from about 1:1 to about 2:1. Ligand compounds which are suitable for this purpose include phosphines and arsines, for example, triphenylphosphine and triphenylarsine, as well as a variety of carboxylic acids, for example, acetic acid, chloracetic acid, benzoic acid and p-chlorobenzoic acid for a copolymer solution in chlorobenzene.

The solvent used in the process of the present invention may be any organic solvent in which the copolymer, catalyst and ligand compounds are soluble and which is not adversely affected by the hydrogenation conditions. Such suitable solvents include aryl hydrocarbons and their alkyl and halo derivatives, such as benzene, toluene, xylene, chlorobenzene and dichlorobenzene, or aliphatic ethers, such as tetrahydrofuran and dioxane, or ketones, such as methylethylketone (MEK). When employed, MEK is reduced to some extent to 2-butanol under the reaction conditions used but this does not interfere with the desired hydrogenation of the copolymer.

It is known from the data presented in U.S. Pat. No. 4,631,315 that the presence of low molecular weight ketones decreases gel formation during selective hydrogenation of carbon-carbon double bonds using ruthenium complexes. We have confirmed that this result also is obtained for the ruthenium complexes described herein which tend to cause gel formation. Mixed solvents also may be used, in which one component is a low molecular weight ketone and the other is a hydrocarbon solvent, for example, methyl ethyl ketone and chlorobenzene in a volume ratio ranging from about 1:10 to about 10:1.

The hydrogenation products of the process of the invention are vulcanizable elastomers, the vulcanizates of which may be used in applications requiring resistance to oxidizing conditions at elevated temperatures for extended periods of time, for example, the various hoses and seals used in the engine compartment of an automobile.

The hydrogenated copolymers may be vulcanized using conventional peroxide or peroxide/sulfur curing systems. It is preferred to use vulcanizates in which from about 50 to about 99.95 percent, more preferably from about 95 to about 99.95 percent, and most preferably about 99 to about 99.95 percent of the carbon-carbon double bonds in the copolymer have been hydrogenated.

DESCRIPTION OF PREFERRED EMBODIMENTS

A first preferred embodiment of the process of the present invention is a homogeneous hydrogenation process wherein the hydrogenation is carried out with copolymer and catalyst dissolved in the solvent in a stainless steel autoclave. The copolymer may be dissolved in the organic solvent and the resulting solution purged, degassed and pressured with hydrogen gas. The reaction vessel is heated rapidly to the desired temperature, agitation initiated followed by catalyst addition. Upon completion of the reaction, the hydrogenated copolymer may be recovered by any convenient method well known in the art. For example, the reaction mixture may be mixed with an alcohol or contacted with hot water and/or steam in order to precipitate the copolymer which is then separated, washed if desired, and dried e.g. under vacuum. If desired the catalyst may be recovered by the method described in U.S. Pat. No. 3,545,963. Preferred catalysts for hydrogenating NBR in this preferred embodiment in stainless steel autoclave include the carbonylruthenium(II) complexes mentioned above, except RuHCl(CO)(PPh$_3$)$_3$ and Ru(CH$_3$COO)Cl(CO)(PPh$_3$)$_2$, which are less preferred since they result in gel formation.

In another preferred embodiment of the process of the present invention, the copolymer is hydrogenated with RuHCl(CO)(PPh$_3$)$_3$ or Ru(CH$_3$COO)Cl(CO)(PPh$_3$)$_2$ as the catalyst in the presence of the ligands triphenyl phosphine or acetic acid respectively, added to the copolymer solution to prevent crosslinking in the NBR before quantitative hydrogenation of the C=C unsaturation is achieved.

In yet another preferred embodiment of the process of the present invention, the copolymer is hydrogenated with carbonylcarboxylatoruthenium(II) complexes generated in situ from hydridocarbonylruthenium(II) derivatives and carboxylic acids, added to copolymer solution in organic solvents. The preferred ratio of ruthenium(II) complex to carboxylic acid in this embodiment preferably is from about 1:0.1 to about 1:1.

EXAMPLES

EXAMPLE 1

In this and succeeding Examples, the copolymers which were hydrogenated are listed in the following Table I, in which the composition figures are given in percent by weight:

TABLE I

| Copolymer | Composition |
|---|---|
| I | Acrylonitrile-butadiene copolymers containing 66 percent butadiene and sold under the trade marks (a) Krynac 34.50 (b) Krynac 803 (c) Krynac XF-300 by Polysar Ltd. |
| II | An acrylonitrile-butadiene copolymer containing 64 percent butadiene and sold under the trade mark Krynac 825 by Polysar Ltd. |
| III | An acrylonitrile-butadiene copolymer containing 62 percent butadiene and sold under the trade mark Krynac 38.50 by Polysar Ltd. |
| IV | An acrylonitrile-butadiene copolymer containing 60 percent butadiene and sold under the trade mark Krynac 40.65 by Polysar Ltd. |
| V | An acrylonitrile-isoprene copolymer containing 66 percent isoprene and sold under the trade mark Krynac 833 by Polysar Ltd. |
| VI | A carboxylated acrylonitrile-butadiene copolymer containing 64 percent butadiene and sold under the trade mark Krynac 221 by Polysar Ltd. |
| VII | A carboxylated acrylonitrile-butadiene copolymer containing 66 percent butadiene and sold under the trade mark Krynac 110-C by Polysar Ltd. |
| VIII | A styrene-butadiene-styrene, ABA block copolymer containing 72 percent butadiene and sold by Aldrich Chemical Company Inc. |
| IX | A styrene-butadiene linear AB block copolymer containing 75 percent butadiene and sold under the trade mark Solprene 1205 by Shell Chemical Company. |
| X | A styrene-butadiene, linear AB block copolymer containing 70 percent butadiene and sold under the trade mark Solprene 308 by Shell Chemical Company. |
| XI | A styrene-butadiene-styrene, radial ABA block copolymer containing 70 percent butadiene and sold under the trade mark Solprene 411 by Shell Chemical Company. |

Acrylonitrile-butadiene copolymers were hydrogenated using carbonylchlorohydridotris(triphenyl phosphine)ruthenium(II) complex with chlorobenzene as solvent in a stainless steel autoclave. Improvement in the process was sought in order to prevent gel formation during hydrogenation. This was accomplished by either adding a ligand compound such as triphenylphosphine or a carboxylic acid.

The copolymer was dissolved in a desired organic solvent (chlorobenzene) with stirring in a 300 ml glass liner. In runs Nos. 2, 3, 4 and 5 a ligand compound was added to the copolymer solution. The catalyst was weighed and placed into a catalyst addition device. The stainless steel (SS 316) autoclave was assembled and the solution degassed by bubbling hydrogen gas through the solution for 5 minutes. The autoclave was purged repeatedly by charging with hydrogen to about 0.7 MPa and then releasing the pressure. The autoclave was pressured with hydrogen to about 1.5 MPa and heated rapidly to 140° C. with agitation. After the temperature stabilized, the catalyst addition device was pressurized to 4.1 MPa with hydrogen in order to introduce the catalyst into the solution. The reaction was allowed to proceed for the desired length of time. Hydrogen gas was added as required to maintain pressure essentially constant throughout the reaction period.

After the desired reaction period, the autoclave was cooled in a cold water bath, depressurized and opened. A volume of iso-propanol equal to about 3 times the volume of solvent used in the reaction was added to the reaction product. The hydrogenated product which precipitated out of solution was separated by filtration, washed with iso-propanol and dried under vacuum.

The hydrogenated product was dissolved in deuterated chloroform and analyzed by proton NMR to determine the amount of hydrogenation of the carbon-carbon double bonds.

In runs Nos. 2 and 3, some isomerization of $\Delta^{4,5}$ unsaturated nitrile bonds in NBR to $\alpha,\beta$-unsaturated nitrile moiety occurred in the course of the hydrogenation reaction. The I.R. spectrum of isomerized product exhibited two nitrile absorption bands at 2240 cm$^{-1}$ and 2220 cm$^{-1}$, attributed to the nitrile function and the conjugated nitrile function respectively. The presence of conjugated nitrile function was further substantiated by the presence of a multiplet centered at 6.2 ppm in the proton NMR spectrum attriuuted to isomerized protons. The proton NMR spectrum for such hydrogenated NBRs showed no resonance due to olefinic protons.

The amount of catalyst, ligand compound and copolymer used in the runs are shown in the following Table II:

TABLE II

| Run[a,b] No. | Copolymer Type | Catalyst Type | Added Ligand Compound Type | Conc. | Reaction Time (Hour) | Percent Hydrogenation |
|---|---|---|---|---|---|---|
| 1 | Ic | HRuCl(CO)(PPh$_3$)$_3$ | — | — | 3 | 90[c] |
| 2 | III | HRuCl(CO)(PPh$_3$)$_3$ | PPh$_3$ | 1.3 | 4 | 95[d] |
| 3 | III | RuCl$_2$(PPh$_3$)$_3$ | PPh$_3$ and C$_2$H$_5$CHO | 1.3 1.3 | 7 | 94[e] |
| 4 | Ia | HRuCl(CO)(PPh$_3$)$_3$ | C$_6$H$_5$COOH | 0.2 | 2.5 | 99+ |
| 5 | III | HRuCl(CO)(PPh$_3$)$_3$ | C$_2$H$_5$COOH | 0.2 | 1.8 | 99+ |

[a]1.7 percent by weight solution of copolymer in 90 ml of chlorobenzene; 0.8 percent by weight of catalyst with respect to copolymer.
[b]Temperature 140° C., Total pressure = 4.1 MPa (hydrogen)
[c]At this conversion, some gel formation occurred
[d]5 percent unsaturation left due to isomerization of C=C to conjugated nitrile moiety
[e]6 percent isomerization as in [d]

In this Example and those that follow, the concentration of the copolymer in solution is in percent by weight based on the total volume on the solution while the concentration of the catalyst and the ligand compounds are percent by weight based on the copolymer. The percent hydrogenation figures given are percent of the carbon-carbon double bonds of the copolymer which has been hydrogenated. When a value of 99+ is given, the amount of hydrogenation is greater than 99.5 percent and less than or equal to 99.95 percent, i.e. essentially complete.

EXAMPLE 2

This Example illustrates a homogeneous solution hydrogenation process of the present invention using chlorotris(triphenylphosphine)rhodium(I) or hydridotetra kis(triphenylphosphine)rhodium(I) to completely hydrogenate isomerized hydrogenated product obtained in Example 1 above using carbonylchlorohydridotris(tri phenylphosphine)ruthenium(II) complex in the presence of ligand i.e. triphenylphosphine.

To the reaction mixture of run No. 2 in Example 1, was added hydridotetrakis(triphenylphosphine)rhodium(I) and triphenylphosphine (2.0 and 20 percent by weight respectively based on the weight of the copolymer) at 110° C. and 4.1 MPa hydrogen pressure. After 9 hours of reaction I.R. spectrum and $^1$H NMR showed complete disappearance of isomerized moiety. The reaction was worked up as outlined in Example 1. $^1$H NMR indicated 99+ % hydrogenation.

EXAMPLE 3

This Example illustrates a homogeneous solution hydrogenation process of the present invention wherein the copolymer Ia from Table I has been hydrogenated with dihydridocarbonylruthenium(II) complex i.e. RuH$_2$(CO)(PPh$_3$)$_3$.

In this run, 90 ml of 1.7 percent by weight solution in chlorobenzene of copolymer Ia from Table I was hydrogenated in the presence of 0.8 percent by weight of the dihydridocarbonylruthenium(II) complex at 140° C. temperature and 4.1 MPa hydrogen pressure. After 2 hours, reaction was terminated and the hydrogenated product was recovered following the work up procedure outlined in Example 1. The degree of hydrogenation was determined to be 99+ % by $^1$H NMR.

EXAMPLE 4

This Example illustrates a homogeneous solution hydrogenation process of the present invention using carbonylcarboxylato derivatives of ruthenium (II) of the general formula Ru(CO)XY(Z)$_2$ where X=carboxylate; Y=chloride or hydride; Z=trialkyl, aryl, or aryl-alkyl phosphine. In this method, copolymers I to XI from Table I were hydrogenated. The procedure and reaction conditions used were the same as outlined in Example 1, except no ligand compound was added to copolymer solutions.

The product in each case was analyzed by proton NMR to determine the amount of hydrogenation of the carbon-carbon double bonds. Analysis by $^{13}$C NMR and IR spectrum showed that no hydrogenation occurred of the nitrile groups of copolymers I through VII of Table I. Analysis by IR spectrum of the hydrogenated product also revealed that no hydrogenation occurred of the acid groups of copolymers VI and VII. The amount of catalyst, copolymer and solvent used are given in the following Table III:

TABLE III

| Run[a,b] No. | Copolymer Type | Conc. | Catalyst Type | Conc. | Reaction Time (Hour) | Percent Hydrogenation |
|---|---|---|---|---|---|---|
| 1 | Ia | 1.7 | RuCl(CO)(ClCH$_2$COO)(PPh$_3$)$_2$ | 0.8 | 2.5 | 99+ |
| 2 | Ia | 1.7 | RuCl(CO)(ClCH$_2$COO)(PPh$_3$)$_2$ | 0.4 | 3.9 | 99+ |
| 3 | III | 1.7 | RuCl(CO)(ClCH$_2$COO)(PPh$_3$)$_2$ | 0.8 | 2.4 | 99+ |
| 4 | III | 1.7 | RuCl(CO)(ClCH$_2$COO)(PPh$_3$)$_2$ | 0.4 | 4.5 | 99+ |
| 5 | Ib | 1.7 | RuCl(CO)(C$_6$H$_5$COO)(PPh$_3$)$_2$ | 0.8 | 1.8 | 99+ |
| 6 | Ic | 1.7 | RuCl(CO)(C$_6$H$_5$COO)(PPh$_3$)$_2$ | 0.8 | 1.9 | 99+ |
| 7 | II | 1.7 | RuCl(CO)(C$_6$H$_5$COO)(PPh$_3$)$_2$ | 0.8 | 2.3 | 99+ |
| 8 | III | 1.7 | RuCl(CO)(C$_6$H$_5$COO)(PPh$_3$)$_2$ | 0.8 | 2.6 | 99+ |
| 9 | III | 3.3 | RuCl(CO)(C$_6$H$_5$COO)(PPh$_3$)$_2$ | 0.8 | 6.2 | 98 |
| 10 | IV | 1.7 | RuCl(CO)(C$_6$H$_5$COO)(PPh$_3$)$_2$ | 0.8 | 2.3 | 99+ |
| 11 | V | 1.7 | RuCl(CO)(C$_6$H$_5$COO)(PPh$_3$)$_2$ | 0.8 | 6 | 99+ |

TABLE III-continued

| Run[a,b] No. | Copolymer Type | Conc. | Catalyst Type | Conc. | Reaction Time (Hour) | Percent Hydrogenation |
|---|---|---|---|---|---|---|
| 12 | VI | 1.7 | RuCl(CO)(C6H5COO)(PPh3)2 | 0.8 | 23 | 94 |
| 13 | VII | 1.7 | RuCl(CO)(C6H5COO)(PPh3)2 | 0.8 | 2.3 | 99+ |
| 14 | IX | 1.7 | RuCl(CO)(C6H5COO)(PPh3)2 | 1.0 | 2.0 | 99+ |
| 15 | X | 1.7 | RuCl(CO)(C6H5COO)(PPh3)2 | 1.0 | 1.8 | 99+ |
| 16 | XI | 1.7 | RuCl(CO)(C6H5COO)(PPh3)2 | 1.0 | 2.2 | 99+ |
| 17 | VIII | 1.7 | RuCl(CO)(C6H5COO)(PPh3)2 | 1.6 | 1.5 | 99+ |
| 18 | Ia | 1.7 | RuCl(CO)(C6H5COO)(P(CH3)Ph2)2 | 0.8 | 19 | 93[c] |
| 19 | III | 1.7 | RuCl(CO)(CH3COO)(PPh3)2 | 0.8 | 2 | 85[d] |
| 20 | III | 1.7 | Ru(CO)(p-ClC6H4COO)2(PPh3)2 | 0.8 | 2 | 99+ |
| 21 | III | 1.7 | HRu(CO)(p-CH3C6H4COO)(PPh3)2 | 0.8 | 1.8 | 99+ |

[a]Percent by weight solution of copolymer in 90 ml of chlorobenzene
[b]Temperature 140° C. Total pressure = 4.1 MPa (hydrogen)
[c]7 percent unsaturation left due to isomerization of C=C to conjugated nitrile moiety
[d]At this conversion some gel formation occurred

EXAMPLE 5

This Example illustrates a homogeneous solution hydrogenation process of the present invention wherein crosslinking in the NMR during the course of hydrogenation reaction with chloroacetato(carbonyl)bis(triphenylphosphine)ruthenium(II) i.e. RuCl(CO)(CH3COO) (PPh3)2 is avoided by adding ligand compound, namely acetic acid. The procedure used was as described in Example 1, except copolymer III from Table I was used.

In this run, 90 ml of 1.7 percent by weight solution of copolymer III in chlorobenzene was added 0.8 wt. percent (based on the weight of copolymer III) of acetic acid. After purging, degassing the system with hydrogen and adjusting the temperature at 140° C., 0.8 wt. percent (based on the weight of copolymer III) of RuCl(CO)(CH3COO)(PPh3)2 was added and the reaction was followed by NMR until complete disappearance of olefinic protons was observed. After 2.5 hours of reaction, following the work up procedure outlined in Example 1, a completely hydrogenated product (99+ %) was obtained.

EXAMPLE 6

This Example illustrates the use of a homogeneous solution hydrogenation process of the present invention to produce hydrogenated copolymer with varying degree of hydrogenation of the carbon-carbon double bonds. The procedure and reaction conditions used were as described in Example 1, except that copolymer III from Table I and chlorochloroacetato(carbonyl)bis(triphenylphosphine) ruthenium(II) i.e. RuCl(CO)(ClCH2COO)(PPh3)2 as a catalyst, were used in this case and the reaction temperature was maintained at 125° C.

In this Example, 1.5 g of copolymer III of Table I was dissolved in 90 ml of chlorobenzene and the solution was degassed with hydrogen after assembling the autoclave. The autoclave was heated rapidly to 125° C., pressured to 4.1 MPa with H2 and 0.8 weight percent of catalyst (based on the weight of copolymer) was added. Samples were withdrawn during the course of the reaction and analyzed by proton NMR for the percent of carbon-carbon double bonds hydrogenated. Analytical results are given in the following Table IV:

TABLE IV

| Reaction Time (hr) | Percent Hydrogenation |
|---|---|
| 0.5 | 35.0 |
| 0.7 | 52.0 |
| 1.3 | 84.0 |
| 2.2 | 94.0 |
| 4.3 | 98.0 |

The results of the above Table IV demonstrate that by stopping the reaction at any desired point and recovering the product as usual, a partially hydrogenated product may be obtained.

EXAMPLE 7

This Example illustrates a homogeneous solution hydrogenation process of the present invention using a range of solvents. The procedure used was that described in Example 1. In each run, 90 ml of 1.7 percent by weight solution of copolymers Ic or III in a suitable organic solvent was hydrogenated in the presence of 12 mg (0.8 percent by weight with respect to copolymer Ic or III) of chlorobenzoato(carbonyl)bis(triphenylphosphine)ruthenium(II). The hydrogen pressure was 4.1 MPa and reaction temperature was maintained at 140° C. The results obtained are reproduced in the following Table V:

TABLE V

| Run[a] No. | Copolymer Type[b,c] | Solvent Type | Reaction Time (Hr) | Percent Hydrogenation |
|---|---|---|---|---|
| 1 | III | Chlorobenzene | 1.8 | 99+ |
| 2 | III | o-Dichlorobenzene | 3.0 | 99 |
| 3 | Ic | Benzene | 6.0 | 99+ |
| 4 | Ic | Toluene | 10.5 | 99 |
| 5 | Ic | p-Xylene | 12 | 99+ |
| 6 | Ic | Methylethylketone | 2.3 | 99+ |
| 7 | Ic | Tetrahydrofuran | 3.5 | 99+ |

[a]1.7 weight percent solution in 90 ml of solvent
[b]0.8 weight percent of RuCl(CO) (C6H5COO)(PPh3)2 with respect to copolymer
[c]140° C. and 4.1 MPa hydrogen pressure As may be seen from the results of above Table V, a variety of solvents may be used to effect the hydrogenation process.

EXAMPLE 8

This Example illustrates a homogeneous hydrogenation process of the present invention using a range of temperatures. The procedure used was as that of Example 1, except copolymer III of Table I and chlorobenzoato(carbonyl)bis(triphenylphosphine)ruthenium (II)

i.e. RuCl(CO)(C₆H₅COO)(PPh₃)₂ as catalyst, were employed in the hydrogenation process. The autoclave was charged with hydrogen to 4.1 MPa and after completion of reaction, the reaction solution was worked up as outlined in Example 1. The results obtained are shown in the following Table VI:

TABLE VI

| Run[a,b,c] No. | Temperature °C. | Reaction Time (Hr) | Percent Hydrogenation |
|---|---|---|---|
| 1 | 125 | 4.3 | 98.0 |
| 2 | 140 | 2.5 | 99+ |
| 3 | 155 | 1.4 | 99+ |

[a] 1.7 weight percent of copolymer III in 90 ml chlorobenzene
[b] 0.8 weight percent of RuCl(CO)(C₆H₅COO)(PPh₃)₂ with respect to copolymer III
[c] 4.1 MPa hydrogen pressure

EXAMPLE 9

This Example illustrates a homogeneous solution hydrogenation process of the present invention using a range of hydrogen pressure. The procedure used was that of Example 1, except copolymer III of Table I was used and the hydrogenation reaction was performed in the presence of chlorobenzoato(carbonyl)bis(triphenyl phosphine) ruthenium (II). The reaction conditions used and results obtained are shown in the following Table VII:

TABLE VII

| Run[a,b,c] No. | Hydrogen Pressure (MPa) | Reaction Time (Hr) | Percent Hydrogenation |
|---|---|---|---|
| 1 | 2.7 | 7.7 | 98.0 |
| 2 | 3.4 | 4.0 | 98.0 |
| 3 | 4.1 | 2.5 | 99+ |

[a] 1.7 weight percent of copolymer III in 90 ml chlorobenzene
[b] 0.8 weight percent of RuCl(CO)(C₆H₅COO)(PPh₃)₂ with respect to copolymer III
[c] 140° C. temperature

EXAMPLE 10

This Example illustrates a homogeneous solution hydrogenation process of the present invention using a range of catalyst concentration. The procedure used was that of Example 1, except that copolymer Ia of Table I was hydrogenated in the presence of chlorochloroacetato (carbonyl)bis(triphenylphosphine). The reaction conditions used and results obtained are shown in the following Table VIII:

TABLE VIII

| Run[a] No. | Catalyst[b,c] Concentration | Reaction Time (Hr) | Percent Hydrogenation | Percent Unsaturation (Isomerization) |
|---|---|---|---|---|
| 1 | 3.3 | 4.8 | 97.0 | 3.0 |
| 2 | 1.7 | 2.0 | 99.0 | 1.0 |
| 3 | 0.8 | 2.5 | 99+ | 0 |
| 4 | 0.4 | 3.9 | 99+ | 0 |

[a] 1.7 weight percent of copolymer III in 90 ml chlorobenzene
[b] wt. percent of RuCl(CO)(ClCH₂COO)(PPh₃)₂ based on the wt. of copolymer Ia
[c] Temperature 140° C. and 4.1 MPa hydrogen pressure The unsaturation obtained owing to isomerization could not be removed even after allowing the reaction to proceed for longer periods of time. These results show that isomerization can be avoided, however, at catalyst concentrations of 0.8 wt. % and below.

EXAMPLE 11

This Example illustrates the use of a mixed solvent system to avoid gel formation.

The procedure of Example 1 was used to effect hydrogenation of copolymer III in a mixed solvent comprising methyl ethyl ketone and chlorobenzene, with or without added phosphine, using HRuCl(CO)PPh₃)₃ or catalyst. The reaction conditions and results obtained are set forth in the following Table IX:

TABLE IX

| Run[a,b,c] | Solvent | Ligand | Reaction Time (Hr) | Percent Hydrogenation | Gel |
|---|---|---|---|---|---|
| 1 | 30 ml MEK + 70 ml chlorobenzene | none | 5 | 99+ | none |
| 2 | 30 ml MEK + 70 ml chlorobenzene | 0.08 g phosphine | 7 | 99+ | none |

[a] 2.0 weight percent of copolymer III
[b] 3.5 weight percent of HRuCl(CO)(PPh₃)₃ w.r.t. copolymer III
[c] 150° C. temperature, 5.5 MPa hydrogen pressure.

The results set forth in the above Table IX illustrate quantitive hydrogenation without gel formation using a mixed solvent system.

SUMMARY OF DISCLOSURE

In summary of this disclosure, the present invention provides a novel process for effecting hydrogenation of carbon-carbon double bond unsaturation in conjugated diene copolymers using certain ruthenium carbonyl complexes. Gel production and isomerization can be suppressed by varying the reaction conditions. Modifications are possible within the scope of this invention.

What we claim is:

1. In a process for the selective hydrogenation of the carbon-carbon double bonds in a copolymer of a conjugated diene and at least one copolymerizable monomer, the improvement which comprises effecting said hydrogenation in the presence of at least one divalent ruthenium complex selected from the group consisting of:

(a) a ruthenium complex of the general formula:

$$Ru(CO)HA(Z)_3 \qquad (1)$$

wherein A is a halogen atom or a hydrogen atom, Z is a —PR₁R₂R₃ group in which R₁, R₂ and R₃ may be the same or different and are selected from alkyl and aryl groups, and (b) a ruthenium complex of the general formula:

$$Ru(CO)XY(Z)_2 \qquad (2)$$

wherein X is a carboxylate group, Y is a halogen atom, a carboxylate group or a hydrogen atom, and Z is as defined above.

2. The process of claim 1 wherein said ruthenium complex is one of the general formula:

$$Ru(CO)HA(Z)_3 \qquad (1)$$

in which A is a chlorine atom, a bromine atom or a hydrogen atom, and Z is the group PR₁R₂R₃ in which R₁, R₂ and R₃ are the same or different and selected from methyl, ethyl, C₆ to C₁₀ aryl and C₇ to C₁₂ aralkyl.

3. The process of claim 2 wherein A is a chlorine atom or a hydrogen atom and each of R₁, R₂ and R₃ is a phenyl group.

4. The process of claim 1 wherein said ruthenium complex is one of the general formula $$Ru(CO)XY(Z)_2 \qquad (2)$$

in which X is a carboxylate group corresponding to the formula R₄COO—, Y is a chlorine atom, a bromine atom, a carboxylate group corresponding to the formula R₅COO— or a hydrogen atom, wherein R$_4$ and R$_5$ are the same or different and are selected from alkyl and aryl groups, and Z is the group —PR$_1$R$_2$R$_3$ in which R$_1$, R$_2$ and R$_3$ are the same or different and selected from methyl, ethyl, C$_6$ to C$_{10}$ aryl and C$_7$ to C$_{12}$ aralkyl.

5. The process of claim 4, wherein the carboxylate groups R₄COO— and R₅COO— are unsubstituted acetate, mono-, di- and tri-halo substituted acetate, unsubstituted benzoate, alkyl substituted benzoate or halo-substituted benzoate.

6. The process of claim 5, wherein the carboxylate groups are ClCH$_2$COO—, Cl$_2$CHCOO—, Cl$_3$CCOO—, F$_3$CCOO—, CH$_3$COO—, C$_6$H$_5$COO—, p—CH$_3$C$_6$H$_4$COO— or p—ClC$_6$H$_4$COO—.

7. The process of claim 6, wherein R$_1$, R$_2$ and R$_3$ are each phenyl.

8. The process of claim 1 wherein said hydrogenation is effected at a catalyst concentration of about 0.1 to about 4 wt. % of the copolymer.

9. The process of claim 8 wherein said hydrogenation is effected in the presence of a gel formation-inhibiting ligand.

10. The process of claim 9 wherein said catalyst is Ru(CO)HCl(PPh$_3$)$_3$ and said ligand is PPh$_3$.

11. The process of claim 9 wherein said catalyst is Ru(CO)Cl(CH$_3$COO)(PPh$_3$)$_2$ and said ligand is acetic acid.

12. The process of claim 9 wherein said ligand is present in an amount of about 1.0 to about 2.0 wt. % of the copolymer and the weight ratio of added ligand compound to ruthenium complex catalyst is from about 1:1 to about 2:1.

13. The process of claim 8 wherein said copolymer contains a nitrile moiety and said hydrogenation is effected at a catalyst concentration of no more than about 0.8 wt. % to avoid nitrile isomerization during said hydrogenation.

14. The process of claim 8 wherein said copolymer contains a nitrile moiety, isomerization of nitrile occurs during said hydrogenation, and said isomerization is removed by further hydrogenation in the presence of a rhodium complex of the formula ARh(PPh$_3$)$_Z$ where A is Cl when Z is 3 or H when Z is 4 to produce a substantially completely saturated product.

15. The process of claim 1 wherein said hydrogenation is effected at an applied hydrogen pressure of about 0.5 to about 7 MPa at a temperature of about 80° to about 200° C.

16. The process of claim 15 wherein said pressure is about 2.5 to about 4.0 MPa and said temperature is about 110° to about 160° C.

17. The process of claim 16 carried out in solvent which is chlorobenzene, o-dichlorobenzene, benzene, toluene or acetone and wherein the copolymer concentration is from about 1 to about 5 wt. %.

18. The process of claim 16 carried out in a solvent comprising a mixture of a low molecular weight ketone and a hydrocarbon solvent.

19. The process of claim 18 wherein said solvent mixture comprises a mixture of methyl ethyl ketone and chlorobenzene in a volume ratio of about 1:10 to about 10:1.

20. The process of claim 4 wherein said ruthenium complexes of the general formula:

$$Ru(CO)XY(Z)_2 \qquad (2)$$

are generated in situ in the solvent from a ruthenium complex of the general formula:

$$RuHX(CO)(Z)_3 \qquad (1)$$

and the respective carboxylic acid in a hydrogen atmosphere.

21. The process of claim 20 wherein the ruthenium complex of the formula:

$$RuHCl(CO)(PPh_3)_3$$

is generated in situ from a ruthenium complex of the formula:

$$RuCl_2(PPh_3)_3$$

and an alkaldehyde.

22. The process of claim 1 wherein said copolymer is selected from the group consisting of butadiene-(meth)acrylonitrile copolymers, isoprene-(meth)acrylonitrile copolymers, copolymers of butadiene with (meth)acrylonitrile and at least one monomer selected from itaconic acid, fumaric acid, (meth)acrylic acid and maleic acid, and AB, ABA and ABCBA block copolymers wherein A is butadiene or isoprene, B is styrene or α-methylstyrene and C is a coupling agent residue.

23. The process of claim 1 wherein from about 30 to about 99.95 percent of said carbon-carbon double bonds are hydrogenated.

24. The process of claim 1 wherein from about 95 to about 99.95 percent of said carbon-carbon double bonds are hydrogenated.

* * * * *